(12) United States Patent
Fuks

(10) Patent No.: US 7,165,184 B2
(45) Date of Patent: Jan. 16, 2007

(54) TRANSFERRING DATA BETWEEN DIFFERENTLY CLOCKED BUSSES

(75) Inventor: Adam Fuks, Milton Keynes (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 296 days.

(21) Appl. No.: 10/504,759

(22) PCT Filed: Jan. 28, 2003

(86) PCT No.: PCT/IB03/00246

§ 371 (c)(1),
(2), (4) Date: Aug. 17, 2004

(87) PCT Pub. No.: WO03/071405

PCT Pub. Date: Aug. 28, 2003

(65) Prior Publication Data

US 2005/0108482 A1  May 19, 2005

(30) Foreign Application Priority Data

Feb. 22, 2002 (GB) ................... 0204144.0

(51) Int. Cl.
*G06F 1/12* (2006.01)

(52) U.S. Cl. .................... 713/400; 713/501

(58) Field of Classification Search ............... 713/400, 713/501, 502, 401; 710/306
See application file for complete search history.

(56) References Cited

U.S. PATENT DOCUMENTS

| 5,256,912 | A | * | 10/1993 | Rios ........................... 327/144 |
| 6,064,626 | A | | 5/2000 | Stevens |
| 6,549,593 | B1 | * | 4/2003 | Rumreich et al. .......... 375/354 |
| 6,816,979 | B1 | * | 11/2004 | Chen et al. ................. 713/400 |
| 6,928,574 | B1 | * | 8/2005 | Radjassamy ................ 713/501 |
| 6,931,562 | B1 | * | 8/2005 | Radjassamy ................ 713/501 |
| 6,949,955 | B1 | * | 9/2005 | Glasser ........................ 326/93 |
| 7,010,713 | B1 | * | 3/2006 | Roth et al. .................. 713/400 |
| 7,061,286 | B1 | * | 6/2006 | Nakamura .................. 327/145 |

* cited by examiner

*Primary Examiner*—Fritz Fleming
*Assistant Examiner*—Harold Kim

(57) ABSTRACT

A method of asynchronously transferring data from a low speed bus to a high speed bus, comprises latching data at a first predetermined instant in a cycle of the clock frequency of the high speed bus, latching data at a second predetermined instant in the same cycle of the clock frequency of the high speed bus, a time period between the second and first predetermined instants being less than the period of the data, and either, if the values of the latched data at the first and second predetermined instants are equal, the latched data is transferred at a third predetermined instant onto the high speed bus, or, if the values sampled at the first and second predetermined instants are different, at the third predetermined instant, transferring the value of the currently present data is transferred onto the high speed bus.

3 Claims, 5 Drawing Sheets

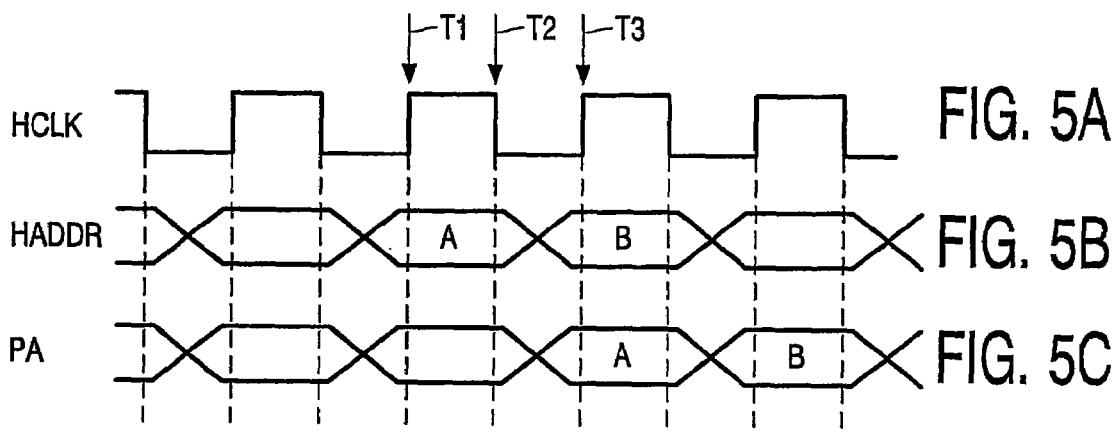
FIG. 5A
FIG. 5B
FIG. 5C
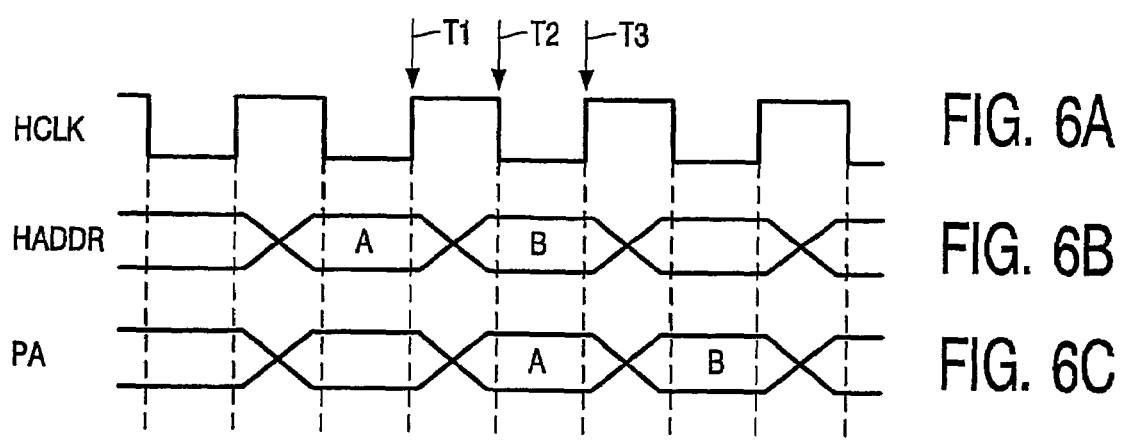
FIG. 6A
FIG. 6B
FIG. 6C

TRANSFERRING DATA BETWEEN DIFFERENTLY CLOCKED BUSSES

TECHNICAL FIELD

The present invention relates to transferring data between busses operating at different clock rates. The present invention has particular, but not exclusive, application to integrated circuits having a bus network architecture with busses operating at different clock rates and being able to transfer data effectively between them, the integrated circuits being used in applications such as cellular telephones.

BACKGROUND ART

U.S. Pat. No. 6,064,626 (Assignee ARM Limited) discloses a peripheral bus arrangement for an integrated circuit. The preamble of the specification discloses a known bus architecture in which a system bus is used for high performance system modules and a peripheral bus is used for low power devices. The system and peripheral busses are operated at the same speed and any clock resynchronisation required due to the particular operating speed of a peripheral unit is performed at that peripheral unit. A bridge is provided for receiving processing request signals from the system bus and supplying processing request signals to the appropriate peripheral unit along with the necessary clock signals to control the operation of the peripheral unit by way of the peripheral bus. The drawback of implementing this architecture in an integrated circuit is that the current consumption is related to the operating speed(s) of the system and peripheral busses, viz. the higher the operating speed, the higher the current consumption, and the capacitance of the peripheral bus, viz. the larger the number of peripheral units connected to the peripheral bus, the higher the current consumption.

In order to reduce current consumption U.S. Pat. No. 6,064,626 discloses an architecture in which there are a system bus, one higher speed peripheral bus and at least one lower speed peripheral bus and bridge circuitry between the system bus and the peripheral busses. Peripheral units are coupled to the higher and lower speed busses on the basis of operational need with a preference being given to the lower speed bus wherever possible. As a result the current consumption is reduced compared to the known bus architecture by minimising the number of peripheral devices coupled to the higher speed peripheral bus.

In another bus architecture, designed by Philips Semiconductors, there is a system bus, termed AHB (Advanced High-performance Bus) operating at a higher clock speed (HCLK) of 78 MHz and a peripheral bus, termed the VPB bus, operating at lower clock speed (PCLK) 13 MHz. Such an architecture achieves current saving whilst having one peripheral bus rather than at least two as taught by the prior art acknowledged above. Using a HDLi (Hardware Descriptive Language Integrator) AHB to VPB bridge, access from the AHB by a register in the processor coupled to the AHB to peripheral devices coupled to the VPB bus can take up to 5 PCLK cycles. This translates to (6 cycles of HCLK per each PCLK cycle)×(5 Cycle access)=30 HCLK cycles in the worst case for a transfer. This is a long delay for the microcomputer that is driving the AHB, which delay is undesirable.

DISCLOSURE OF INVENTION

An object of the present invention is to reduce the delay in a register accessing a peripheral device in a bus network architecture.

According to a first aspect of the present invention there is provided a method of transferring data from a first device having a first clock frequency to a second device having a second clock frequency higher than the first clock frequency, comprising latching data at a first predetermined instant in a cycle of the second clock frequency, latching data at a second predetermined instant in the cycle of the second clock frequency, a time period between the second and first predetermined instants being less than the period of the first clock frequency, and if the values of the latched data at the first and second predetermined instants are equal, transferring the latched data at a third predetermined instant onto a bus to which the second device is coupled or if the values sampled at the first and second predetermined instants are different, at the third predetermined instant, transferring currently present data onto the bus.

According to a second aspect of the present invention there is provided a method of transferring data from a second device operating at a second clock frequency to a first device operating at a first clock frequency which is lower than the second clock frequency, the method comprising storing data from the second device in an intermediate register at the second clock frequency and transferring the data from the intermediate register to the first device at the first clock frequency.

According to a third aspect of the present invention there is provided a data transfer bridge for coupling a high speed bus to a low speed bus, the bridge comprising first latching means for latching a first low speed data sample on the low speed bus at a first predetermined instant, second latching means for latching a second low speed data sample on the low speed bus at a second predetermined instant, a time interval between the first and second predetermined instants being less than the period of the low speed data, and comparing means for comparing the first and second samples of the low speed data, said comparing means including first means responsive to the first and second samples being the same value for transferring the latched data at a third predetermined instant onto the high speed bus and second means responsive to the first and second samples being different for transferring to the high speed bus a sample of the low speed data currently present at a third predetermined instant.

According to a fourth aspect of the present invention there is provided a device for transferring high speed data to a storage device clocked at a low clock speed which is lower than the clock speed of the high speed data, the storage device comprising an intermediate register into which high rate data is clocked, and means for causing data stored in the intermediate register to be transferred to another register at the low clock speed.

The method in accordance with the first aspect of the present invention achieves a complete transparency between the AHB bus and a Low Power Fast Access Bus (LPFAB) thus allowing register access on the LPFAB bus using a single HCLK cycle. Further, it reduces power consumption by limiting the clocking events on the LPFAB bus and guarantees the correct passage of data between two clock domains.

BRIEF DESCRIPTION OF DRAWINGS

The present invention will now be described, by way of example, with reference to the accompanying drawings, wherein:

FIGS. 5A to 5C is a first set of timing diagrams relating to implementing the method in accordance with the first aspect of the present invention, FIGS. 6A to 6C is a second set of timing diagrams relating to implementing the method in accordance with the first aspect of the present invention.

In the drawings the same reference numerals have been used to indicate corresponding features.

MODES FOR CARRYING OUT THE INVENTION

Figure 1:
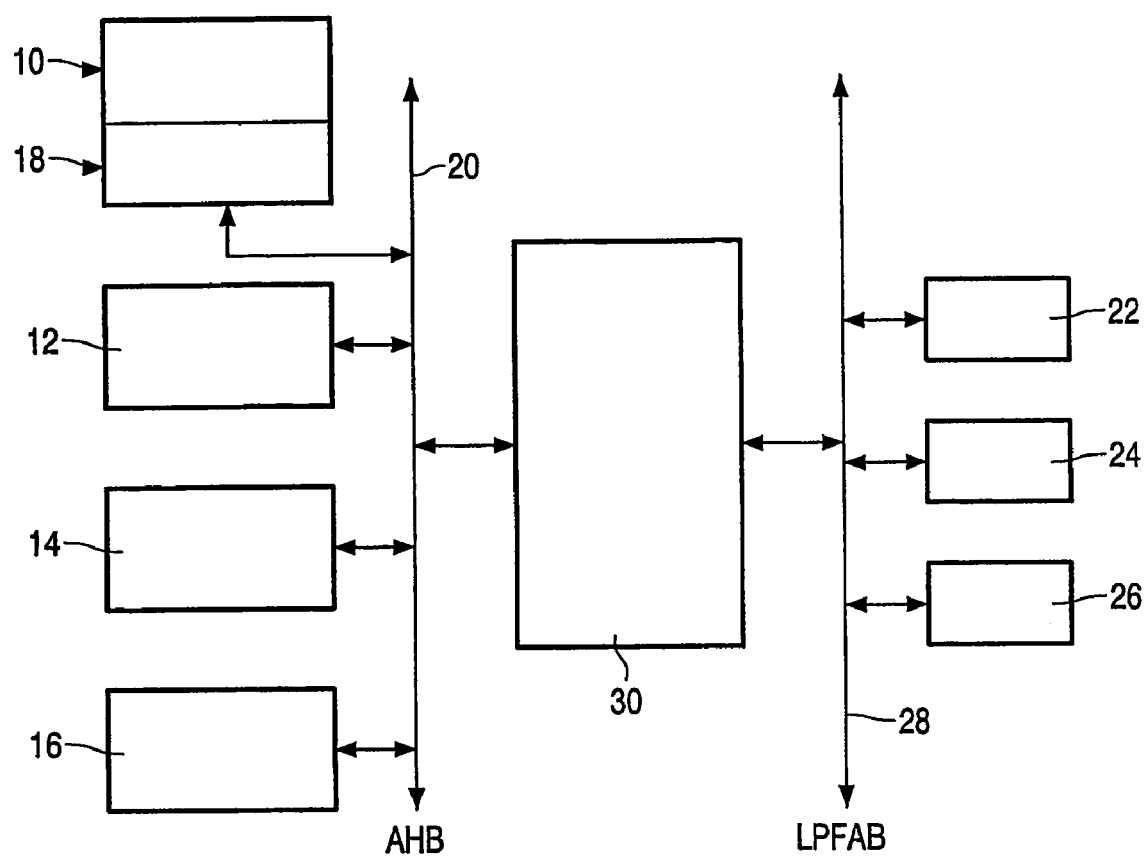
FIG. 1 is a block schematic diagram of a system with an AHB to LPFAB bus bridge.

Referring to FIG. 1, the illustrated system comprises a plurality of devices coupled by way of respective two-way links to an Advanced High-performance Bus (AHB) 20 operating at full system speed HCLK, for example 78 MHz but it can be another speed depending on the processor used. The devices include a processor 10, an arbiter 12 to control access to the AHB 20 by the various devices coupled to the bus, an address decoder 14 and on-chip internal and external memory controllers collectively referenced 16. If the processor 10 operates at a higher frequency than HCLK then a bus bridge 18 is coupled between the processor 10 and the link to the AHB 20.

Low bandwidth, non bus-mastering devices, such as a UART (Universal Asynchronous Receive and Transmit) 22, GPIO (General Purpose Input Output) 24 and a timer 26 are coupled by 2-way links to a LPFAB (Low Power Fast Access Bus) interface 28 to simplify their bus interfaces and to off-load the AHB interface 20. The LPFAB interface 28 is able to run at the AHB 20 interface speed or at slower speeds, for example 13 MHz. An AHB-to-LPFAB bus bridge 30 connects the devices 22, 24 and 26 to the AHB 20. The bus bridge 30 is a slave device on the LPFAB interface.

Figure 2:
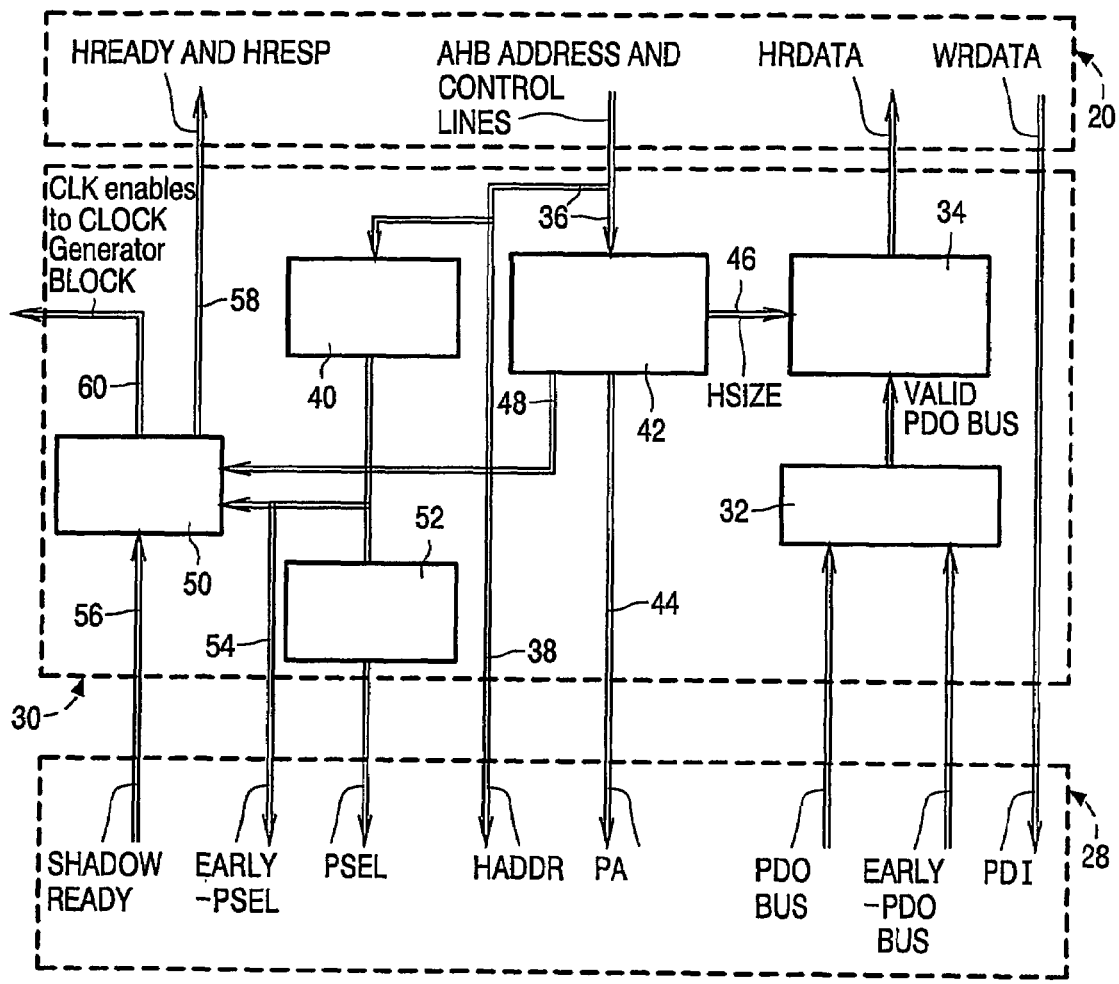
FIG. 2 is a block schematic diagram of the AHB to LPFAB bus bridge.

Referring to FIG. 2, the bus bridge 30 includes a number of operational features and for convenience of description the various abbreviations used will be identified.

| Clocks: | |
|---|---|
| PCLK | Peripheral clock for example 13 MHz. However some of the peripherals use even slower PCLKs, each peripheral can have its own PCLK speed so long as it is slower than HCLK. |
| WRITE_CLK | Single pulse for a write (a gated pulse of HCLK). |
| READ_CLK | Single pulse for a read (a gated pulse of HCLK), only used for read-clear registers. |

| -continued | |
|---|---|
| Address busses and Peripheral Select lines: | |
| HADDR | Address bus (This bus is only used for READ data verification). |
| PA | Address bus. |
| PSEL | Peripheral select using PA. |
| EARLY-PSEL | Peripheral select using HADDR bus (This signal is only used for READ data verification). |
| Data busses; | |
| PDI | Peripheral Data In bus. |
| PDO | Peripheral Data Out bus (based on PA address). |
| EARLY_PDO | Peripheral Data Out (based on HADDRaddress and only used for read verification) |
| Ready line: | |
| SHADOW_READY | Shadow register of the chosen address is ready to receive more data (if no shadow register is used for the address then the default is "1"). |

The various function blocks in the bus bridge 30 comprise a data verification block 32 to which the data busses PDO and EARLY_PDO are connected. Valid data on the PDO bus is supplied by the block 32 to a data steering block 34 which provides an output HRDATA. AHB address and control lines 36 are coupled to a HADDR output 38, to an address decode block 40 and to a block 42 in which control signals are delayed by 1 HCLK cycle. The block 42 has three outputs, output 44 coupled to PA, output 46 coupled to the block 34 and output 48 providing delayed control signals to an input of a block 50 representing Read(R)/Write(W) clock enable and HREADY generator.

The address decode block 40 is coupled to a delay by 1 HCLK cycle block 52 which provides an output PSEL, to the block 50 and to an EARLY_PSEL output 54. The block 50 has a SHADOW_READY input 56 and two outputs 58, 60. The output 58 provides HREADY and HRESP signals to the AHB 20 and the output 60 provides clock enables to a clock generator block (not shown).

The method in accordance with the first aspect of the present invention is concerned with register access which avoids the need for synchronisation and particularly to ensuring that any data that is passed through to the AHB bus has been stable for at least half a HCLK cycle and can therefore be trusted to be valid data.

A form of read verification is necessary when the AHB and LPFAB clocks are not related and as a consequence data can be changing in the LPFAB register as it is being read by the AHB 20 (FIG. 1). The need for the data to be stable in order to be trusted is because data which has not been stable for at least half a HCLK cycle could potentially be in the middle of a transition.

Figure 3:
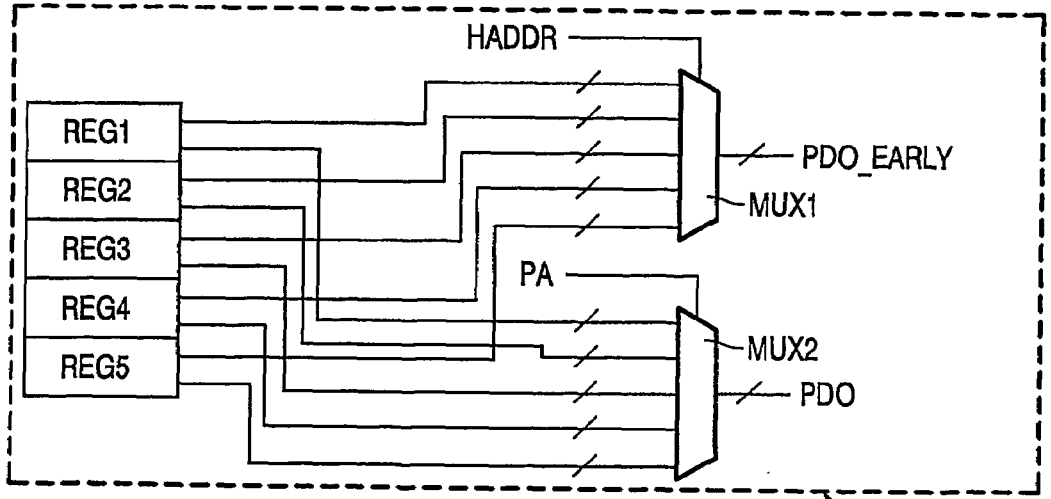
FIG. 3 is a block schematic diagram of the data-out circuitry of a peripheral device.

Referring to FIG. 3, the read verification is implemented by propagating both the AHB Address Lines and the LPFAB Address Lines through the LPFAB bus 28 (FIG. 1). Each LPFAB peripheral device PDEV comprises five registers REG1 to REG5. Each of the registers has two outputs coupled respectively to inputs of multiplexers MUX 1 and MUX 2 so as to enable reading from the current HADDR address and from the PA address simultaneously, thus enabling read verification. More particularly MUX 1 is clocked using the HADDR address and MUX 2 is clocked using the PA address, the HADDR address being at least one HCLK cycle ahead of the PA address. In this example, the HADDR address is put on the AHB bus nearly two cycles before the actual read. More particularly the address is put on after the rising edge of HCLK, that is time T1 in FIGS.

5A and 6A, on the following edge, that is time T2 in FIGS. 5A and 6A, it is latched by the AHB peripherals and on the next rising edge of HCLK, that is time T3 in FIGS. 5A and 6A, the data transfer actually takes place.

Referring to FIGS. 2, 5A to 5C and 6A to 6C, the read verification scheme comprises (1) the data verification block 32 latching in the value of the EARLY_PDO (data out based on HADDR) at time T1, viz. the rising edge of HCLK; (2) the data verification block 32 latching in the value of PDO (data out based on PA) at time T2, viz. the falling edge of HCLK immediately following time T1; and (3) the data verification block 32 comparing the readings taken at the times T1 and T2. If they are the same, viz. as shown in FIG. 5B, then this data "A" is transferred to the AHB bus 20 (FIG. 1) at time T3, viz. at the next following rising edge to time T1, regardless of what the PDO value is at the time T3. This is because there is no guarantee that data will not have changed between times T2 and T3. However if the readings at times T1 and T2 are different, viz. as shown in FIG. 6B then that means that a PLCK rising edge has occurred between times T1 and T2 and since PCLK is definitely slower than HCLK, it can be guaranteed that another edge will not come between times T2 and T3, viz. as shown in FIG. 6B. This means that the data will be stable at the time T3 and therefore the data verification block 32 will allow the PDO value "B" (FIG. 6C) directly onto the AHB bus.

This data verification scheme ensures stable data while incurring no delay on the data transfer. The logic which does the comparison between the latched readings at the times T1 and T2 has half an HCLK cycle to do the comparison.

Figure 7:
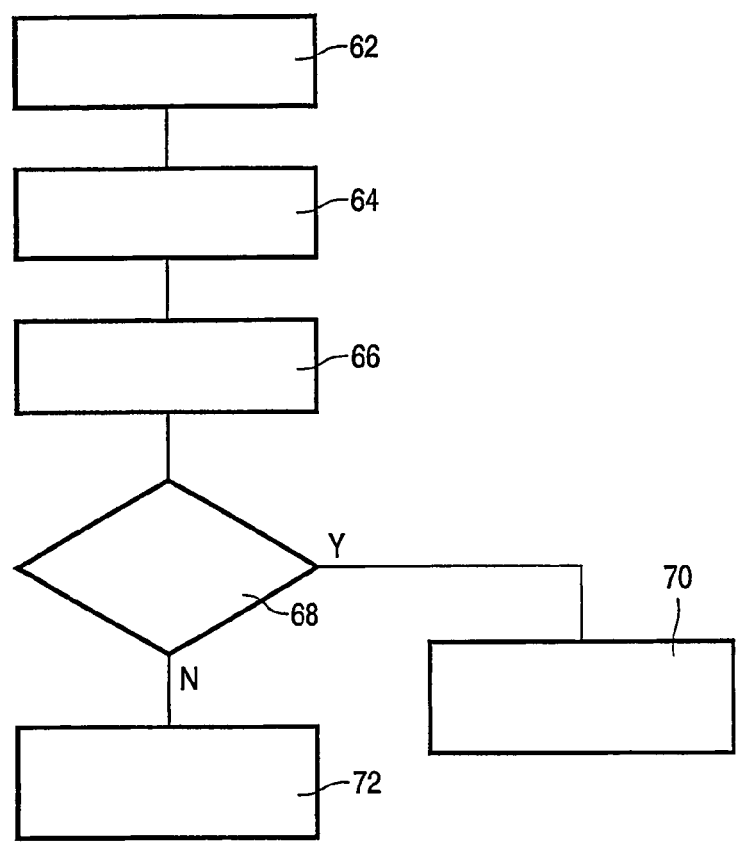
FIG. 7 is a flow chart relating the method in accordance with the first aspect of the present invention.

The read verification process is summarised by the flow chart shown in FIG. 7. Block 62 denotes latching the value of PDO_EARLY at the time T1. Block 64 denotes latching the value of PDO at the time T2. Block 66 denotes comparing the values latched at times T1 and T2. Block 68 denotes checking if the latched values are equal and, if they are equal (Y), then block 70 denotes transferring the data to the AHB bus at the time T3. If they are not equal (N) block 72 denotes transferring the data at the time T3 to the AHB bus.

Register reads are performed whenever the PA bus contains an address which is a valid register on LPFAB. No clock is used to indicate the time of read. Data is always MUXed out of each peripheral device through the PDO bus and is combined in a Wired-OR PDO_MUX block. Peripherals which do not contain the address pointed to, output zeroes.

In the case of a Read-clear access (where the register's content needs to change upon a read) a READ_CLK is used to tell the block that the register is being read.

Figure 4:
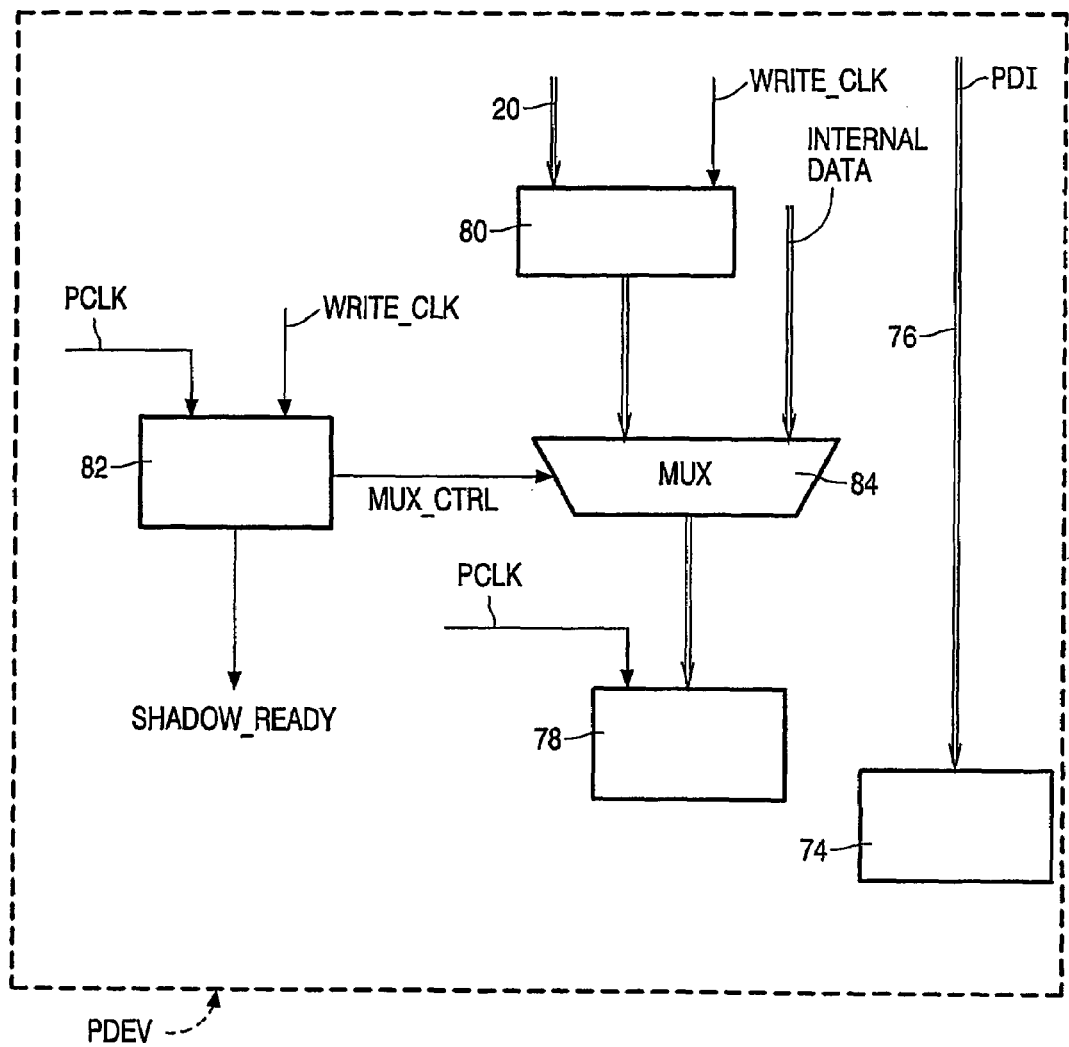
FIG. 4 is a block schematic diagram of the data-in circuitry of a peripheral device.

When performing writes, the nature of the register affects the procedure used. Referring to FIG. 4, control registers 74 (registers which can only be written to by the processor and not by a peripheral device) are written to from PDI via data line 76 by setting-up the PA address, PSEL, and the write occurs on the rising edge of WRITE_CLK.

Registers 78 which can have both the processor and a peripheral device writing to them employ shadow registers 80 when receiving data from the processor. In such a case, the processor writes to the shadow register 80 and the data is subsequently transferred to the actual register 78 by way of a MUX 84. A shadow register controller 82 controls the data transfer between the shadow register and the actual register 78, the latter being clocked at PCLK. When writing from a peripheral device being clocked at PCLK, data from the PDO is applied directly to the MUX 84 for writing into the actual register 78.

More particularly in order to ensure the correct passage of data from the HCLK domain, viz. AHB, to the PCLK domain there needs to be synchronising of the data to PCLK. It would not be ideal to delay the processor since synchronising can take about the time of a PCLK cycle which is a relatively long time. Instead the processor writes to the shadow register 80 using the WRITE-CLK as though it were a control register and subsequently proceeds to transfer the data to the actual register 78.

The writing method allows the processor to write into the shadow register in one HCLK cycle and move on. However, for as long as SHADOW_READY is low, the processor will be inhibited from performing a further write to the shadow register 80 or from reading from it. This inhibiting of writing/reading the shadow register 80 avoids writing new data into the shadow register 80 before old data has been transferred to the actual register 78 and also avoids the processor reading the old data from the shadow register 80 again. In the case where the processor attempts to perform register access to that address while the shadow register controller 82 is busy, the bridge 30 will assert HREADY low and HRESP=RETRY, the processor will be called to retry the read/write, this will continue until the SHADOW_READY line goes back to high.

Figure 8:
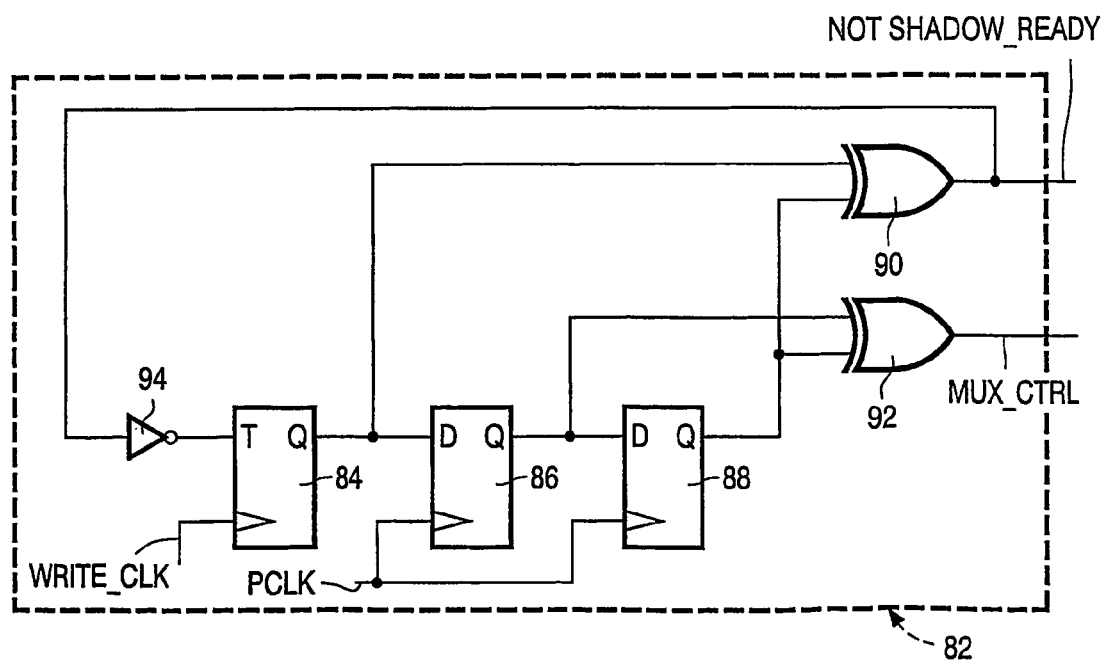
FIG. 8 is a block schematic diagram of the shadow register controller shown in FIG. 4.

FIG. 8 illustrates an embodiment of the shadow register controller 82 (FIG. 4). The controller 82 comprises a T-type flip-flop 84 whose output is coupled to the D input of a first D-type flip-flop 86, the output of which is coupled to the D input of a second D-type flip-flop 88. Outputs of the flip-flops 84 and 88 are coupled to respective inputs of a first Ex-OR gate 90. Outputs of the D-type flip-flops 86, 88 are coupled to respective inputs of a second Ex-OR gate 92. An output of the Ex-OR gate 90 is coupled by way of an inverter 94 to the T input of the flip-flop 84. A WRITE_CLOCK signal is applied to the clock input of the flip-flop 84 and PCLK signals are applied to the clock inputs of the flip-flops 86, 88. The Ex-OR gate 90 provides a Not SHADOW_READY output and the Ex-OR gate 92 provides a MUX_CTRL output.

In operation, when a write occurs the WRITE_CLK causes the output of the T-type flip-flop 84 to toggle and change state immediately lowering the SHADOW_READY line. Simultaneously as this occurs, the shadow register 80 will also be written to. By feeding the SHADOW_READY line to the T-type flip-flop 84, a further write will not toggle the SHADOW_READY line. On the following rising edge of PCLK, MUX_CTRL will be "1" and on the following rising edge the data will be transferred from the shadow register 80 (FIG. 4) to the actual register 78 (FIG. 4) through a MUX 84 (FIG. 4). At the same time as the transfer occurs, MUX_CTRL will drop to "0" and SHADOW_READY will rise back to "1".

A synchronisation problem may arise when the output of a shadow register 80 written to by WRITE_CLK is used in determining the value of a register clocked by PCLK. This problem can be solved in one of two ways. In a first way PCLK is synchronised with WRITE_CLK so that although PCLK is much slower than WRITE_CLK, PCLK will only rise at the same time as a rising edge of HCLK. In a second way a flip-flop is disposed between a clock generator block which produces PCLK and the PCLK signal which gets to LPFAB provides an early warning of a PCLK rising edge arriving. This can then be used as a not ready line for the AHB bus 20 (FIG. 1). This can block the processor from writing to the LPFAB bus 28 (FIG. 1). It is possible to use more than one flip-flop in order to get a longer warning time.

The described method of transferring data between busses provides a low-power high speed solution for interfacing between a fast CPU bus and a slow peripheral bus. This method is applicable to a variety of bus architectures where the speed of the peripheral bus is no greater than the CPU bus.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of bus architectures and component parts therefor and which may be used instead of or in addition to features already described herein.

INDUSTRIAL APPLICABILITY

Electronic circuits which employ a bus to transfer data.

The invention claimed is:

1. A method of transferring data from a first device having a first clock frequency to a second device having a second clock frequency higher than the first clock frequency, comprising latching data at a first predetermined instant in a cycle of the second clock frequency, latching data at a second predetermined instant in the cycle of the second clock frequency, a time period between the second and first predetermined instants being less than the period of the first clock frequency, and if the values of the latched data at the first and second predetermined instants are equal, transferring the latched data at a third predetermined instant onto a bus to which the second device is coupled or if the values sampled at the first and second predetermined instants are different, at the third predetermined instant, transferring currently present data onto the bus.

2. A method as claimed in claim 1, characterised in that the time differences between the first and second predetermined instances and between the second and third predetermined instants are substantially equal.

3. A method as claimed in claim 2, characterised in that each of the time differences corresponds substantially to half a cycle of the clock frequency.

* * * * *